Fig. 1B

FIG. III

INVENTORS
PAUL E. LORENTZEN
DARRELL W. TESDALL
By Doyle N. Jeu
AGENT

INVENTORS
PAUL E. LORENTZEN
DARRELL W. TESDALL
BY Dock N. Jeu
AGENT

INVENTORS
PAUL E. LORENTZEN
DARRELL W. TESDALL
BY
AGENT

United States Patent Office 3,323,033
Patented May 30, 1967

3,323,033
STATIC INVERTER SYSTEM
Paul E. Lorentzen, Pacific Palisades, and Darrell W. Tesdall, Los Angeles, Calif., assignors to Douglas Aircraft Company, Inc., Santa Monica, Calif.
Filed Feb. 15, 1963, Ser. No. 258,719
6 Claims. (Cl. 321—5)

This invention relates generally to inverter circuits and more particularly to a three-phase static inverter circuit. The invention also concerns novel inverter elements and their interconnections and interactions with and in the overall circuit.

An inverter is a device for converting direct current into alternating current. The devices which can accomplish this include both mechanical and electronic means. The mechanical type inverter is commonly a rotary machine such as an inverted synchronous converter, and the electronic type inverter can include electronic tubes which are switched on and off to convert a direct supply current into an alternating output current. These devices have heretofore been extremely heavy and bulky in comparsion to their power output. This was especially true where a three-phase inverter was concerned.

A three-phase generator is approximately as heavy and large as a comparable inverter. Because of the relatively large weight and/or size required for either a three-phase generator or inverter to obtain even reasonable power outputs therefrom, most aircraft except the very large ones, do not carry a three-phase generator or inverter. Three-phase power is desirable in aircraft because certain three-phase devices as three-phase motors are far more efficient and powerful (better running) than either a comparable direct current or single phase motor, especially at high altitudes. While practically all aircraft have a source of direct current, and many have a source of single phase alternating current, only a relatively few, large aircraft have a three-phase power source. Further, these three-phase power sources have been invariably of the very heavy and bulky mechanical type generator or inverter.

It is an object of this invention to provide a three-phase static inverter which is extremely lightweight and small in size but has a comparatively high and versatilely useful power output.

Another object of the invention is to provide a three-phase static inverter which is operable from either a direct current source or a single phase, alternating current source.

Another object of the invention is to provide a static inverter which can provide either three-phase or single phase power having waveforms that are symmertical and do not contain a third harmonic.

A further object of this invention is to provide an inverter circuit having a well regulated direct voltage source and a repetitively operable short circuit or overload protector.

A still further object of this invention is to provide a static inverter having an output therefrom which eliminates the need for heavy, power consuming output filters.

Another object of the invention is to provide a highly reliable and precise-frequenry pulse generator in a static inverter, to produce a correspondingly reliâble and precise frequency output from the inverter.

Another object of the invention is to provide simple and effective gating means in a static three-phase inverter for producing three-phase control signals from the output of a sequential pulse generator.

And another object of this invention is to prvide a static inverter having power output stages capable of generating useful three-phase power without the use of output transformers.

Briefly, and in general terms, the foregoing and other objects are preferably accomplished by providing an inverter circuit including a direct power supply which is proportionately regulatable or controllable in output according to variations of inverter circuit output, and also operable to remove power that energizes the operationally controlling elements of the inverter circuit during inverter overload, a sequential pulse generator, a gating circuit connected to the generator for producing three-phase control signals to respective driver stages, and power output stages driven by the driver stages to produce three-phase quasi square output waves which can be applied to a suitable three-phase output transformer.

This invention possesses numerous other objects and features, some of which together with the foregoing, will become apparent from the following detailed description of an illustrative embodiment of the invention. The invention will be more fully understood from the following description to be taken in conjunction with the accompanying drawings, in which:

FIGURES 1A, 1B and 1C, together show a complete circuit diagram of the illustrative embodiment of the inverter circuit;

Figure 1A:
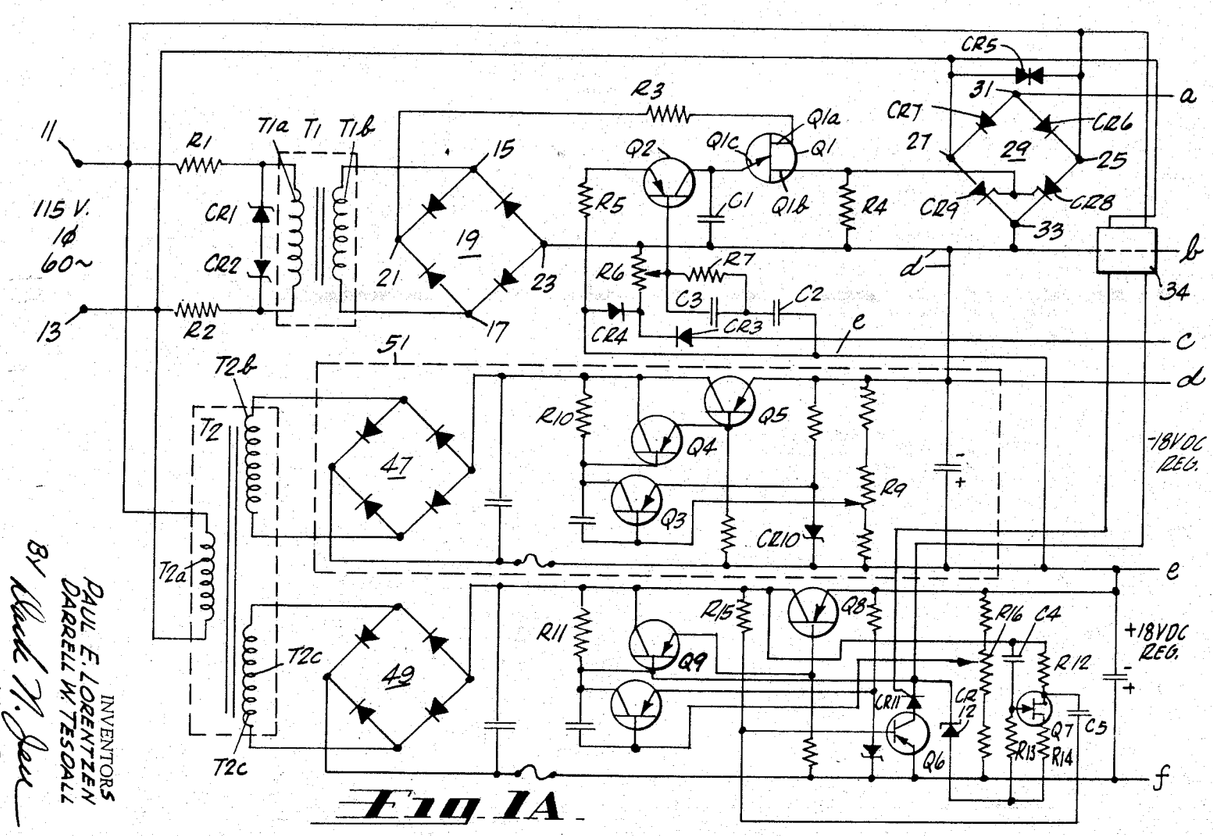
Figure 1B:
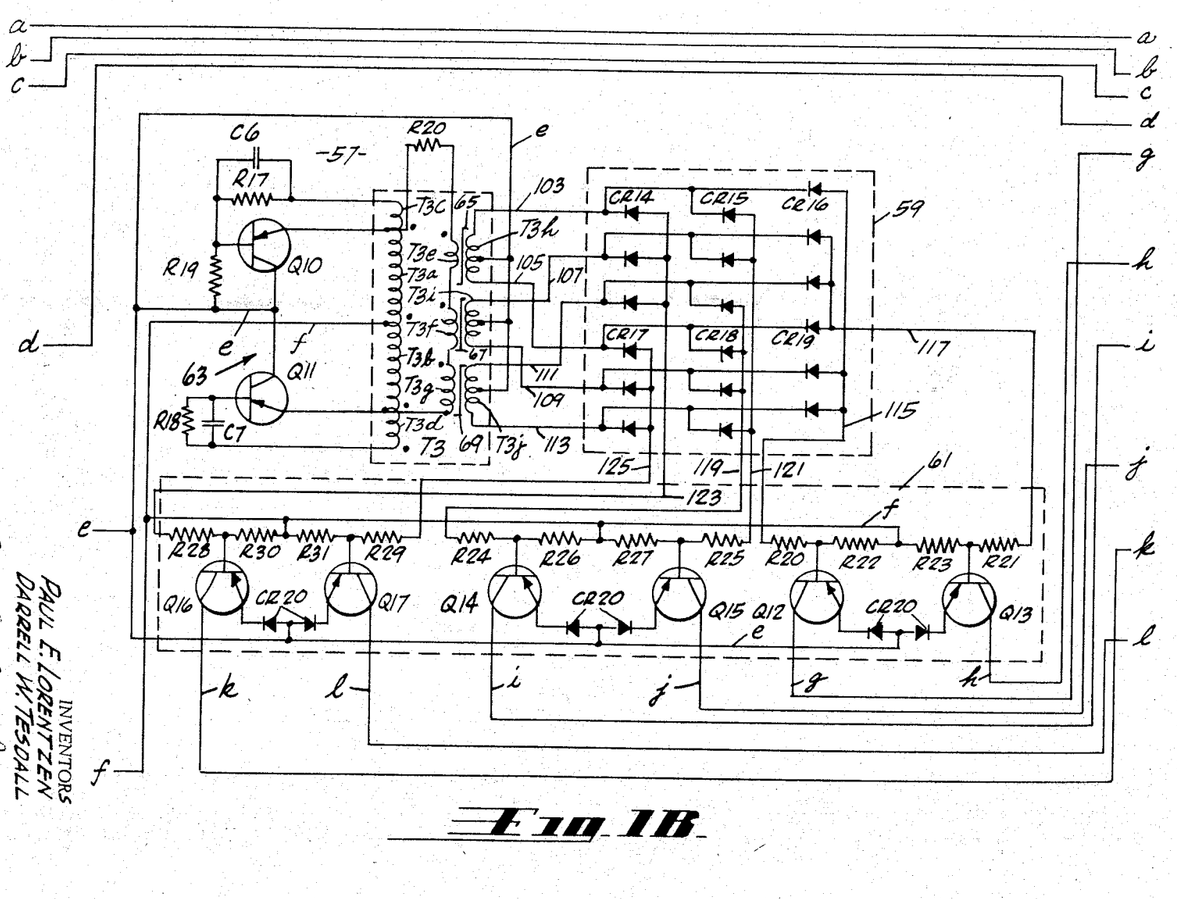

FIGURES 1A, 1B and 1C, together, show an illustrative example of one embodiment of this invention. These three figures may be conveniently viewed in entirety by arranging the figures in sequential order and connecting the ends of leads which are identified by the same reference letter respectively together between adjacent figures. For example, the ends of leads a, b, c, d, e and f of FIGURE 1A are to be joined to the correspondingly identified lead ends at the left side of FIGURE 1B. Similarly, the ends of the leads a, b, c, d, g, h, i, j, k and l at the right side of FIGURE 1B are to be connected to the correspondingly identified lead ends indicated in FIGURE 1C.

FIGURE 1A generally shows the input power supply system including regulation and protective circuits for the inverter circuit. Line power, for example, 115 volts, 60 c.p.s., single phase, is provided at terminals 11 and 13. This voltage is applied through limiting resistors R1 and R2 to the primary winding T1a of a transformer T1 having its secondary winding T1b connected to input terminals 15 and 17 of a full wave bridge rectifier 19. Oppositely oriented, series connected zener diodes CR1 and CR2 are connected across the primary winding T1a as shown.

The bridge rectifier 19 has output terminals 21 and 23. The terminal 21 is connected to a first base Q1a of unijunction transistor Q1 through a series resistor R3, and the terminal 23 is connected to lead d and to the second base Q1b of the unijunction transistor Q1 through a resistor R4. The emitter Q1c of the unijunction transistor Q1 is connected to the collector of transistor Q2, and to lead d through capacitor C1.

The emitter of the transistor Q2 is connected to the lead e through series resistor R5. The lead c is connected to the anode of diode CR3 which has its cathode connected to terminal 23 and lead d through a potentiometer R6. The lead e is connected to the anode of diode CR4 which also has its cathode connected to terminal 23 and lead d through the potentiometer R6.

The lead e is also connected to the base of the transistor Q2 through two series connected capacitors C2 and C3, the latter capacitor C3 being shunted by resistor R7. The wiper or adjustable tap of the potentiometer R6 is also connected to the base of the transistor Q2. The transistor Q2 serves as an adjustable resistor whose resistance is varied according to the potential on the base of the transistor Q2.

Variation of the effective resistance of transistor Q2 varies the current flow through it, and hence the charging rate of the capacitor C1. The charging path is from lead e through resistor R5, transistor Q2 and capacitor C1 to the lead d. When the capacitor C1 is charged to a sufficiently high potential, the unijunction transistor Q1 becomes forward biased and permits the capacitor C1 to discharge rapidly through resistor R4 to produce an output voltage across it.

The line power input terminals 11 and 13 can be also connected to input terminals 25 and 27 of a controlled full wave bridge rectifier 29 having output terminals 31 and 33. A thyrector CR5 is connected between the output terminals 25 and 27, and provides protetction against transients by breaking down and absorbing the very high transients that may appear. A separate single phase, 60 c.p.s. power source can be connected directly to input terminals 25 and 27 instead of using the same source at terminals 11 and 13; however, the separate single phase power source must be in phase with that at terminals 11 and 13.

The output terminal 31 is connected to input terminals 25 and 27, through respective diodes CR6 and CR7. The terminals 25 and 27 are, in turn, connected to output terminal 33 through diodes CR8 and CR9, respectively. The output terminal 31 is connected to lead a, and the output terminal 33 is connected to lead d and to lead b through a rectifying magnetic amplifier 34. The magnetic amplifier 34 is conventional and is energized by the single phase power from terminals 11 and 13. The direct current control winding can consist merely of a single turn of the output lead b passing around the saturable core of the magnetic amplifier 34. The magnitude of the direct current flowing in the output lead b, of course, controls the output from the magnetic amplifier 34. The magnetic amplifier 34 includes the usual rectifying diodes which are connected to the ends of the output windings provided on the saturable core transformer of the amplifier 34.

The diodes CR8 and CR9 are silicon controlled rectifiers having anode, cathode and gate electrodes. As is well known, the diodes CR8 and CR9 are turned on when the gates are made sufficiently positive with respect to their cathodes. Once the diodes CR8 and CR9 are turned on, they will conduct until anode potential becomes zero or negative with respect to the cathodes. The diodes are thus similar to thyratrons. In FIGURE 1A, only one of the diodes CR8 or CR9 which is then forward biased is turned on by a positive gate voltage.

The gates of the diodes CR8 and CR9 are connected to the end of resistor R4 tied to base Q1b of the unijunction transistor Q1, and the cathodes are connected to the output terminal 33 which is tied to the other side of the resistor R4 through the lead d. Thus, the output voltage across the resistor R4 is used to control the rectified output voltage from the bridge 29. The bridge 29 output passes through the magnetic amplifier 34 to leads b and a. The direct voltage provided between the leads b and a is, for example nominally 80 volts, and is the basic source of output power for the inverter circuit.

If the diodes CR8 and CR9 were alternately conducting continuously, the output voltage between the leads b and a would have a waveform including a series of contiguous, positive half cycles of a sine wave. The voltage at the end of one half cycle and, of course, the start of the next half cycle is zero so that the conducting diode CR8 or CR9 will be turned off at these points. Since the output voltage developed across the resistor R4 is dependent upon the discharge of the capacitor C1 through the unijunction transistor Q1, the start of a charging cycle of the capacitor C1 should be synchronized with a zero voltage point of the input signal to the full wave bridge rectifier 29 for proper control of the output voltage between leads b and a.

Figure 2:
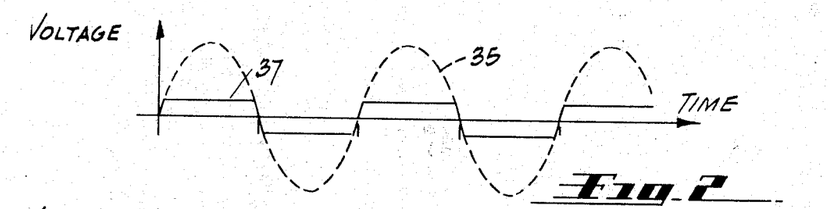
FIGURE 2 is a graph illustrating partial formation of a synchronizing signal used in regulating or controlling the main power supply for the inverter circuit.
Figures 3, 4:
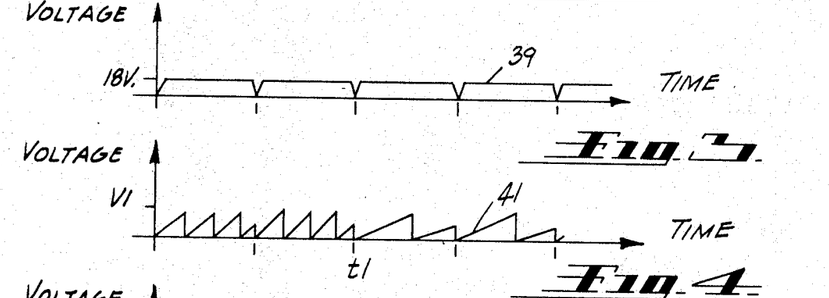
FIGURE 3 is a graph illustrating the full formation of the synchronizing signal noted above.
FIGURE 4 is a graph showing a sawtooth wave which is used in regulating or controlling the main power supply for the inverter circuit.

FIGURES 2 and 3 are graphs which illustrate the manner in which a synchronizing signal is obtained for controlling operation of the unijunction transistor Q1 and the start of a charging cycle of the capacitor C1. The single phase, 60 c.p.s. sine wave signal which is applied to input terminals 11 and 13, and 25 and 27 is indicated as curve 35 in FIGURE 2. The effect of the zener diodes CR1 and CR2 is to remove peak portions of the positive and negative half cycles. This produces a trapezoidal waveform 37 having positive and negative half cycles as shown in FIGURE 2.

The voltage waveform 37 is transformed by the transformer T1 and rectified by the full wave rectifier 19 to produce the voltage waveform 39 shown in FIGURE 3. This signal appears between the output terminals 21 and 23, and is applied to the unijunction transistor Q1 through resistor R3. The maximum value of this voltage is, for example, 18 volts and has half cycle notches which drop to zero volt.

FIGURE 4 is a graph which illustratively depicts the charging and discharging cycles of the capacitor C1. The waveform curve 41 is slightly exaggerated (for clarity of illustration) in that the repetition rate is somewhat reduced from that encountered in practice, and a sudden frequency change at time t1 is shown which does not actually occur but is made for explanatory purposes. A normal repetition rate, for example, can vary from 360 c.p.s. at full load to 130 c.p.s. at minimum load, approximately.

The curve 41 is a sawtooth waveform representing the voltage on the capacitor C1 which is applied to the emitter Q1c of the unijunction transistor Q1. For a given potential on the base of the transistor Q2, it has an effective resistance which permits the capacitor C1 to be charged at a certain rate. This is indicated by the first rising sawtooth of the waveform curve 41. The capacitor C1 charges at this rate until it reaches the voltage V1 when the unijunction transistor Q1 becomes forward biased to permit the capacitor C1 to be rapidly discharged through the transistor Q1 and resistor R4. The voltage on the capacitor C1 drops sharply at the end of the first sawtooth, of course.

Figure 5:
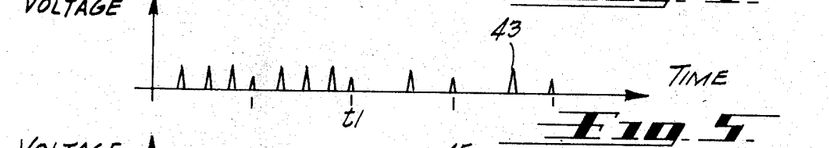
FIGURE 5 is a graph showing a series of control pulses derived from the sawtooth wave of FIGURE 4 and which are used to control the conduction of a rectifier that supplies the main power output for the inverter circuit.

FIGURE 5 is a graph showing a plot of the voltage developed across the resistor R4 versus time. When the capacitor C1 discharges rapidly through the unijunction transistor Q1 and resistor R4, a voltage pulse such as the first one of the pulses 43 is produced across resistor R4 and applied to the gates of the diodes CR8 and CR9, turning on the one that is then forward biased. The discharged capacitor C1 begins to charge up again and is quickly discharged later as indicated by the second sawtooth of the curve 41 of FIGURE 4. The second pulse of the series of pulses 43 is produced again with the rapid discharge of the capacitor C1, and this second pulse is applied without effect to the gates of the already conducting, forward biased diode or the reversed biased, nonconducting diode.

Figure 6:
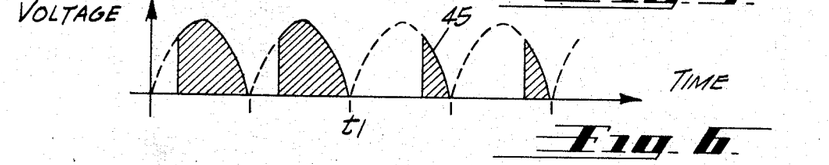
FIGURE 6 is a graph which shows the controlling effect of the pulses of FIGURE 5 on the rectifier output.

FIGURE 6 is another graph plotting the output voltage of the full wave rectifier 29 appearing between leads $b$ and $a$ following the magnetic amplifier 34. Curve 45 can be seen to comprise pulses or portions of half cycles of a fully rectified sine wave as indicated by the broken lines completing each portion of the curve 45. The curve 45 is zero until the first pulse of the series of pulses 43 is produced. This causes conduction of either diode CR8 or CR9 so that the 60 c.p.s. single phase, sine wave input signal to the rectifier 29 is rectified and passed to its output. Thus, the first portion of the rectified half cycle begins at a magnitude on the first half cycle corresponding to the time that the first pulse of the series of pulses 43 is produced.

Subsequent pulses 43 appearing during the first half cycle have no effect, of course, on the now conducting diode CR8 or CR9. At the end of the first half cycle, the voltage to the rectifier 29 drops to zero so that the conducting diode CR8 or CR9 is turned off and ceases conducting. At the same time, the base voltage to the unijunction transistor Q1 also falls to zero and conducts to discharge the charging capacitor C1. This is indicated by the first notch to zero voltage on the curve 39 of FIGURE 3.

When the unijunction transistor Q1 conducts, the fourth sawtooth in curve 41 of FIGURE 4 is cut short as shown, to immediately begin a new charging cycle. Thus, the notches to zero voltage on curve 39 of FIGURE 3 act to synchronize the charging cycles of the capacitor C1 with the start of each new half cycle of the input signal to the rectifier 29. A pulse which is the fourth one of the series of pulses 43 of FIGURE 5 is produced with the end of the fourth sawtooth of curve 41 in FIGURE 4, but this pulse cannot fire or turn on either diode CR8 or CR9 because the voltage to their anodes is zero at the end of the first half cycle of the input signal to the rectifier 29. Thus, a new and similar cycle of operation is begun.

It is apparent from the first two pulses or portions of each half cycle of the curve 45 shown in FIGURE 6, that a certain direct voltage is obtained after suitable filtering and smoothing of the pulses. It can also be easily seen that this direct voltage will be dependent upon the charging rate, which is governed by the effective resistance of the transistor Q2, of the capacitor C1. The effective resistance of the transistor Q2 is, of course, varied with the potential on its base.

Variation of the potential on the base of the transistor Q2 as produced by changing the adjustment of the wiper of the potentiometer R6, would alter the charging rate of the capacitor C1. Assuming that this had been done at time $t1$, the sawtooth waveform curve 41 of FIGURE 4 may be changed to that following the time $t1$ and having a lower frequency or repetition rate. When the charging rate of capacitor C1 is reduced, it is apparent from the first sawtooth after the time $t1$ of curve 41 in FIGURE 4, that a longer time is needed for the voltage on the capacitor C1 to reach the voltage V1 at which time the unijunction transistor Q1 is forward biased to discharge the capacitor C1.

Discharging of the capacitor C1 produces the first pulse after the time $t1$ of the series of pulses 43 of FIGURE 5, and this pulse is applied to turn on one of the diodes CR8 or CR9 as before. However, it can be seen in FIGURE 6 that an output voltage between the leads $b$ and $a$ is not produced until near the end of the sine wave half cycle that is to be rectified by the rectifier 29.

The second sawtooth following the time $t1$ is cut short as before due to the corresponding synchronizing zero voltage notch of curve 39 in FIGURE 3. The resulting pulse of the series of pulses 43 in FIGURE 5 does not fire the diodes CR8 or CR9 because the voltage applied to the anodes thereof is then zero as at the end of the first pulse or portion of the sine wave half cycle. The cycle of operation is then repeated to produce successive pulses or portions of the sine wave half cycles which are suitably filtered to produce a lower direct voltage than obtained previously. This is clearly evident by comparing the hatched areas for the two different charging rates illustratively shown and discussed.

The line input terminals 11 and 13 are connected to the primary winding T2a of a transformer T2 having two secondary windings T2b and T2c as shown in FIGURE 1A. The secondary windings T2b and T2c are connected to respective full wave diode rectifiers 47 and 49 which are each part of a regulator circuit for providing respective regulated output voltages therefrom. Regulated direct voltages are obtained for supplying certain of the control circuits of the inverter circuit. Since there are no other interacting circuits here with the 60 c.p.s., single phase, input line voltage on terminals 11 and 13, another separate and independent input power source may be used, if more convenient, to produce the desired, regulated direct voltages.

The regulator circuit 51 is substantially conventional and only a brief description of it is necessary. The other regulator circuit including the rectifier 49 is substantially identical to circuit 51. However, interconnecting with the regulator circuit including the rectifier 49 is a novel short circuit or overload protector. This short circuit protector, except for one resistor R11, includes those elements shown in the circuit below the regulator circuit 51 which are in addition to those elements comprising the regulator circuit 51. The description of the regulator circuit 51 is applicable to both regulator circuits shown in FIGURE 1A.

Briefly, the wiper of potentiometer R9 senses a variation, say, of a decrease of the regulated negative output voltage such that the wiper of potentiometer R9 becomes more positive relative to the fixed reference voltage established by the zener diode CR10 on the emitter of transistor Q3. The positively increased base of transistor Q3 reduces the current flow through it, and as a consequence, the base of the transistor Q4 connected to the common junction between the resistor R10 and the collector of the transistor Q3 increases negatively.

This causes the transistor Q4 to conduct more heavily such that the potential of the base of transistor Q5, which is the series control element, increases negatively and the effective resistance of the transistor Q5 is reduced. The lead $d$ which is negative relative to the lead $e$ therefore increases negatively to increase the negative output voltage between leads $d$ and $e$. An increase of the negative output voltage produces the opposite effect to regulate the voltage between leads $d$ and $e$. The collector of transistor Q5 is normally at $-22$ volts, for example, and the emitter thereof, or lead $d$, is at the regulated $-18$ volts relative to the lead $e$.

The regulated output voltage of the regulator 51 is used to supply the transistor Q2 and charge capacitor C1. Current from lead $e$ follows the path of resistor R5, transistor Q2, capacitor C1 and to the lead $d$. The lead c is connected to the potentiometer R6 through diode CR3, and serves to impress a positive direct voltage which is proportional to the output of the inverter circuit to the potentiometer relative to the lead d. This sample voltage of the output of the inverter circuit produces a voltage of 22 volts, for example, on lead c for application to the potentiometer R6.

If the output of the inverter circuit should fluctuate as in causing a rise in output, for example, the voltage on the lead c increases so that the voltage on the base of the transistor Q2 also increases to increase the effective resistance of the transistor. This, of course, lowers the charging rate of capacitor C1 and produces the effect illustrated in exaggerated form in FIGURE 6. The result is that the basic supply voltage for the inverter circuit between leads b and a is decreased to its original level. A similar corrective action takes place for decreases instead of increases of output voltage from the inverter circuit.

The output of the inverter circuit is a three-phase alternating voltage, and the positive direct voltage sample thereof is derived through a suitable three-phase step-down transformer (T8) connecting with a three-phase rectifier (135), in a manner as will be described in greater detail later. When the inverter circuit is first turned on, its output builds up comparatively slowly and the sample voltage on lead c likewise rises relatively slowly.

The sample voltage on lead c does not rise sufficiently fast to increase the effective resistance of transistor Q2 adequately such that the conducting durations of the diodes CR8 or CR9 and thus the output from the rectifier 29 for the usual initial, transient surge cycles are made short enough to prevent the initial power surges and transients from appearing at the output of the rectifier 29 and leads b and a. If these initial transient surges are conducted to any extent through the rectifier 29, even for relatively short durations, the very high peaks and overshoots would burn out or damage the transistors and components that are supplied by leads b and a.

Figure 7:
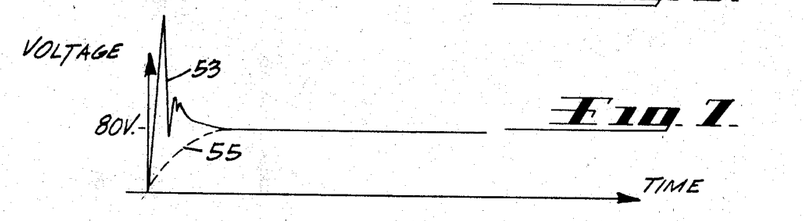
FIGURE 7 is another graph illustrating voltage surges and transients that normally initially occur in the main power supply for the inverter circuit, and the desired elimination thereof.

FIGURE 7 is a graph which shows a plot of the initial transient surge voltage which would appear on leads b and a because of the slow build-up of the output voltage of the inverter circuit, and of the sample direct voltage derived therefrom and which appears on lead c. Curve 53 indicates the high transient voltage that initially appears before control can be established to obtain the nominal 80 volts that normally appears on the leads b and a. By preventing high transient overshoots so that the direct voltage on leads b and a builds up gradually as indicated by curve 55, no damage will be done to the transistors and components supplied through leads b and a.

In order to eliminate the initial transient surges, the regulated output voltage from the regulator 51 in FIGURE 1A is utilized. This regulated output voltage is developed very quickly in comparison with the output from the inverter circuit. The voltage on lead e, positive with respect to the lead d, is impressed across the potentiometer R6 through the diode CR4 and is also applied directly to the base of the transistor Q2 through the network including series capacitors C2 and C3, and resistor R7 shunting the latter capacitor.

When the inverter circuit is first energized, the series capacitors C2 and C3 are unchanged and act as a short to apply the relatively positive voltage on lead e to the base of the transistor Q2. This produces a high effective resistance of the transistor Q2 and the diodes CR8 and CR9 will not be fired until the capacitor C1 is slowly charged to the necessary potential. Of course, after the capacitors C2 and C3 are fully charged, this network has no further effect on the transistor Q2 and the sample direct voltage on lead c should be then built up to assume control.

However, if the capacitance of the capacitors C2 and C3 are made large enough to be effective until the voltage on lead c is sufficiently built up, the sensitivity of the control system involving transistors Q1 and Q2, and capacitor C1 is too low, having too slow a response time for proper control of fluctuations of output of the inverter circuit.

For this reason, the diode CR4 is provided to apply the voltage (18 volts, for example) from lead e to the potentiometer R6 after the capacitors C2 and C3 are fully charged but still before the voltage (22 volts, for example) on lead c has been adequately built up. This ensures that a reasonable voltage will be provided on the base of the transistor Q2 throughout the initial starting period.

It was previously mentioned that the circuitry shown below the first regulator 51 in FIGURE 1A includes another regulator which is substantially similar to the regulator 51 and also a short circuit or overload protector. The output of the second regulator is between the leads e and f wherein lead f is positive relative to the lead e. Since the lead d is negative relative to the lead e, lead e is the common output lead for the two regulators.

The magnetic amplifier 34 is the short circuit or excessive current sensing element for the short circuit or overload protector. The short circuit protector shuts off the inverter circuit by removing the regulated output voltage between leads f and e suppling inverter circuit control elements for a predeterimned duration and then automatically returns this regulated output voltage. However, if the short or excessive current condition is still present, the protector will repeat its operation or until the short or excessive current condition is removed.

The short circuit or overload protector includes, in addition to its sensing element 34, a transistor Q6, silicon controlled rectifier CR11, resistor R11, unijunction transistor Q7, capacitors C4 and C5, zener diode CR12, and resistors R12, R13, R14 and R15. These elements are connected to the regulator below regulator 51 as shown in FIGURE 1A. If a short ocurs in the output of the inverter circuit or any part affecting current flow through the sensing element 34, excessive current is drawn therethrough which increases the voltage output to, for example, .5 volt which activates the short circuit protector.

It can be seen in FIGURE 1A that the emitter of the transistor Q6 is connected to lead f, and the collector is connected to the anode of the silicon controlled rectifier CR11. The cathode of the rectifier CR11 is connected to one of the output leads from sensing element 34, the other output lead of which is connected to the gate of the silicon controlled rectifier CR11. The collector of the regulator series element, transistor Q8, is connected to one end of the capacitor C4 and resistor R12. The collector of the transistor Q8 is also connected to the base of transistor Q6 through resistor R15, and the other end of resistor R12 is also connected to the base of the transistor Q6 through a capacitor C5.

The other end of the capacitor C4 is connected to the emitter of unijunction transistor Q7 and to one end of a resistor R13. The resistor R12 is also connected to one end of the unijunction transistor Q7, the other base of which is connected to one end of a resistor R14. The other ends of the resistors R13 and R14 are connected to the cathode of the silicon controlled rectifier CR11 through the zener diode CR12. The cathode of the rectifier CR11 is also connected to the base of transistor Q9 and one end of a resistor R11, the other end of which is connected to the collector lead of the transistor Q8.

The regulator shown in FIGURE 1A just below the regulator 51 functions in like manner as the regulator 51. However, when excessive current flows through the sensing element 34, the voltage output from it is sufficient to fire the silicon controlled rectifier CR11. The transistor Q6 is biased through resistor R15 to conduct so that current flows through the transistor Q6, rectifier CR11 and resistor R11. The base of transistor Q9 approaches the positive potential of lead f and a sufficiently high voltage is developed across the resistor R11 which is enough to break down the zener diode CR12. When the base of the transistor Q9 becomes highly positive, the base of the transistor Q8 also becomes highly positive to cut off the transistor Q8. This removes the +18 volts regulated output voltage.

The voltage developed across resistor R11 is applied across the parallel branches including resistor R13 in series with capacitor C4, and the series connected resistor R14, unijunction transistor Q7 and resistor R12. The zener diode CR12 breaks down when the voltage applied to it is approximately 5 volts, for example. The capacitor C4 charges for about 13 seconds, for example, until it reaches a voltage which forward biases the unijunction transistor Q7 and rapidly discharges the capacitor C4 through resistor R12. A positive voltage is thus obtained and applied through capacitor C5 to the base of the transistor Q6 turning off the same. This, of course, cuts off the silicon controlled rectifier CR11 and returns the regulator system including full wave rectifier 49 back to normal operation.

However, the rectifier CR11 is again fired to repeat the cycle if excessive current is still flowing through the sensing element 34. This sensing element can incidentally be simply a piece of nichrome wire, or very small resistor if the lead d did not connect with the output of the rectifier 29. That is, a small resistor can be used instead of magnetic amplifier 34 in lead b if the voltage regulator 51 output was not used to energize the control circuit including the transistors Q1 and Q2 which control the full wave rectifier 29. It is also obviously possible to include a current sensing element (not shown) in series with the rectifier CR11 to trigger a suitable alarm whenever excessive current flows through sensing element 34. Alternatively, the resistor R11 could include the resistance of a warning lamp or relay coil which would have such threshold values that the lamp is not visibly lit or the relay pulled in until the rectifier CR11 is fired and conducting. Such a relay coil, when sufficiently energized, would actuate a relay (not shown) to remove inverter power and inactivate the inverter circuit. The relay is, of course, released for normal operation current conduction through resistor R11.

FIGURE 1B shows a magnetic sequential pulse generator 57 including a saturable core transformer T3, a gating circuit 59 and (three) driver stages 61 for the inverter circuit. The pulse generator 57 produces outputs similar to a conventional ring counter. The pulse generator 57 operates on the principle that the voltage developed in an output winding (of transformer T3) is proportional to the flux changes in the magnetic core on which the output winding is wound. The generator 57 is basically a magnetically coupled multivibrator 63 having a saturable, multiple core output transformer T3. It has extremely high reliability and minimum maintenance is required for it. The pulse generator 57 is shown, described and claimed in greater detail in a co-pending application Ser. No. 258,528 filed on Feb. 4, 1963 by Paul E. Lorentzen for a magnetic sequential pulse generator.

The generator 57 which is illustratively shown in FIGURE 1B is for low repetition rates or frequencies and relatively long output pulse widths or durations. However, much higher repetition rates or frequencies and much shorter pulse widths or durations can be easily obtained by use, for example, of small ferrite cores. The transformer T3 has three toroidal cores, for example, which are preferably stacked one on top of the other as schematically indicated in FIGURE 1B. A single, separate output winding is wound around each of the cores and, additionally, a single bias winding is also wound around each of the cores but these bias windings are connected in series. The primary windings T3a and T3b, and the feedback windings T3c and T3d are wound around the entire stack of cores.

The leads a, b, c and d do not connect with any components in FIGURE 1B. However, the leads e and f are connected to provide their regulated output voltage to the pulse generator 57 and the driver stages 61. The lead f is positive with respect to the lead e, of course. The common junction of the primary windings T3a and T3b is connected to lead f, and the collectors of transistors Q10 and Q11 are connected to lead e as shown.

The common junction of primary winding T3a and feedback winding T3c is connected to the emitter of the transistor Q10, and the common junction of the primary winding T3b and feedback winding T3d is similarly connected to the emitter of the transistor Q11. The free end of the feedback winding T3c is connected to the base of the transistor Q10 through a speed-up network including resistor R17 shunted by capacitor C6. Similarly, the free end of the feedback winding T3d is connected to the base of the transistor Q11 through another speed-up network including resistor R18 shunted by capacitor C7. The base of the transistor Q10 is also connected to lead e through start resistor R19.

The common junction between primary winding T3a and feedback winding T3c is connected to one end of bias winding T3e through a limiting resistor R20. The other end of the bias winding T3e is connected through bias winding T3f to one end of bias winding T3g, the other end of which is connected to the common junction between primary winding T3b and feedback winding T3d. As indicated in FIGURE 1B, the bias windings have successively increasing numbers of turns.

For example, bias winding T3e can have 10% of the number of turns of a primary winding, bias winding T3f can have 20%, and bias winding T3g can have 30%. Output windings T3h, T3i and T3j have their center taps connected to lead e, and are respectively wound on the same cores as the bias windings T3e, T3f and T3g. Alternatively, the first bias winding T3e can be completely eliminated so that bias winding T3f can start with the 10% figure, and bias winding T3g can be increased an equal increment for a 20% figure. The elimination of the first bias winding T3e would remove any offset or displacing effect on the hysteresis loop for the first core, and the loop would be centered normally along the abscissa ampere-turn axis symmetrically on the ordinate flux axis.

The bias winding T3e and output windings T3h are wound on core 65, bias winding T3f and output winding T3i on core 67, and bias winding T3g and output winding T3j on core 69. The bias windings T3e, T3f and T3g have successively increasing numbers of turns as mentioned previously and indicated in FIGURE 1B. The effect of such bias windings is to offset or displace the hysteresis loops progressively from the ordinate flux axis along the abscissa ampere-turn axis. The result is that outputs of the cores are progressively delayed and energized in sequence with increasing magnetizing current.

Figure 8:
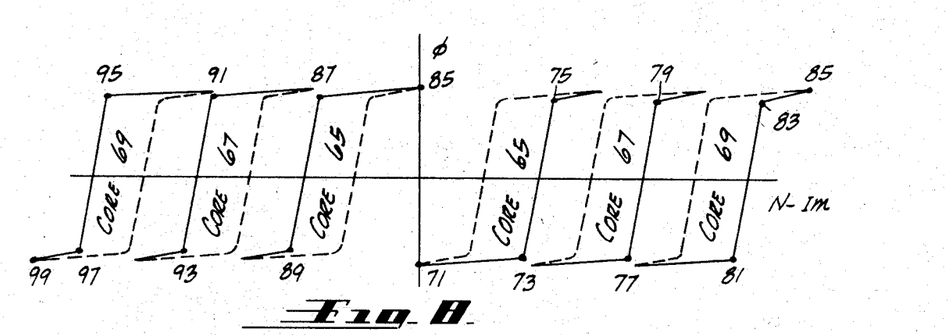
FIGURE 8 is a graph showing the effect of a successively increasing number of bias winding turns on the hysteresis loops of a multiple core transformer used in a pulse generator for the inverter circuit.

FIGURE 8 is a graph in which flux $\phi$ is plotted against magnetizing ampere-turns $N-Im$, illustrating the effect of the bias windings on the hysteresis loops of each of the cores 65, 67 and 69. A positive bias current through the series bias windings T3e, T3f and T3g would displace the hysteresis loops to the right of the flux ordinate axis, and a negative bias current resulting from a switch of conduction of the transistors Q10 and Q11 would displace the hysteresis loops for the cores 65, 67 and 69 to the left of the flux ordinate axis as indicated in FIGURE 8. Positive output pulses, across an output winding, are produced for a positive magnetizing current $Im$, and negative output pulses are produced after the magnetizing current drops to zero and becomes sufficiently negative to overcome the effect of the then negative bias current. The magnitude of these output pulses across an output winding are, for example, 12 volts, or 6 volts relative to its center tap or the lead e.

Figure 9:
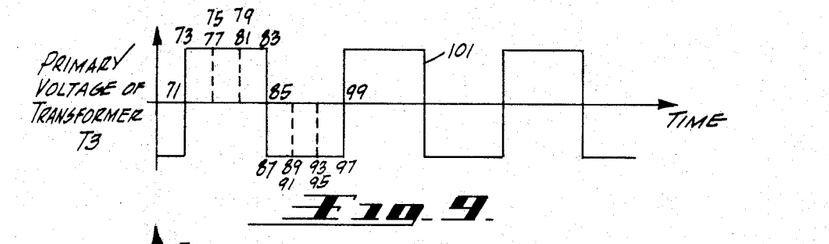
FIGURE 9 is a graph illustrating the primary voltage waveform for the pulse generator transformer.

FIGURE 9 is a graph which is a plot of primary winding voltage produced by the multivibrator 63 versus time.

This is the usual waveform produced in a magnetically coupled multivibrator as is well known. The various points 71, 73, 75, 77, 79, 81, 83, 85, 87, 89, 91, 93, 95, 97 and 99 indicated on the hysteresis loops shown in FIGURE 8 are also indicated along the waveform 101 to generally inter-relate the input voltage on the primary windings T3a and T3b of the transformer T3 with the hysteresis loops of the cores 65, 67 and 69. It is noted that the displacement of the individual hysteresis loops do not effect operation on the primary side of the circuit since the voltage produced in the primary windings is equal to the sum of the voltages produced in the individual output windings times the turns ratio.

Figure 10A:
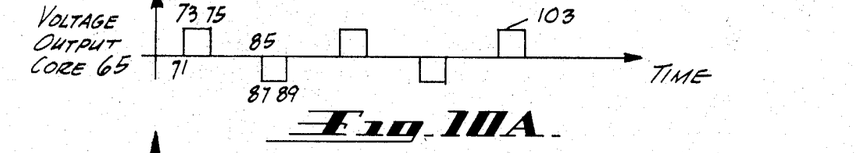
FIGURES 10A, 10B and 10C are graphs which illustrate the output pulses from the pulse generator.
Figure 10B:
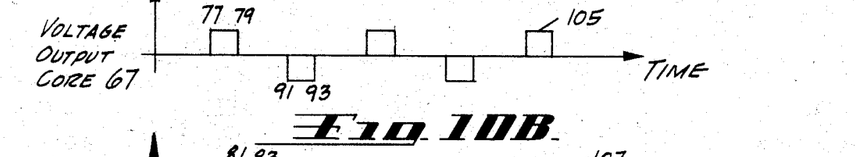
Figure 10C:
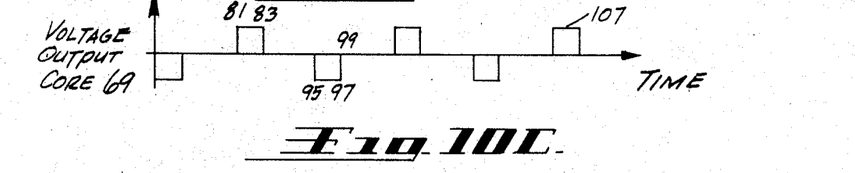

FIGURES 10A, 10B and 10C are graphs which illustrate the output signals from the cores 65, 67 and 69, respectively. As is evident from these figures, the various numbers interrelating the points on the hysteresis loops in FIGURE 8 with points along the waveform 101 in FIGURE 9 are also shown on certain of the pulses of the series of pulses 103, 105 and 107 in FIGURES 10A, 10B and 10C, respectively. The frequency of the square wave 101 is, for example, 400 c.p.s.

At point 71 in FIGURES 8 and 10A, all of the cores 65, 67 and 69 are in negative saturation. As the magnetizing current Im builds up in a primary winding T3a, for example, point 73 is reached and core 65 is driven out of saturation. Between points 73 and 75, the flux change in core 65 produces the first pulse of the series of pulses 103 shown in FIGURE 10A, and which appears in the output winding T3h of the first core 65. As the magnetizing current continues to increase, core 65 is driven into positive saturation and point 77 is reached in core 67. Between points 77 and 79 the flux changes rapidly until positive saturation is reached in core 67. This flux change produces the first pulse of the series of pulses shown in FIGURE 10B, and which appears in the output winding T3i of the second core 67. This latter pulse is displaced 60 electrical degrees from the former pulse as taken with respect to the square wave 101.

Similarly, the third core 69 is finally driven from negative to positive saturation between points 81 and 83, producing the first positive pulse of the series of pulses 107 shown in FIGURE 10C. This pulse, of course, appears in the output winding T3j of the third core 69, and is displaced 60 electrical degrees as indicated in FIGURE 9, from the first pulse of the series of pulses 105 of FIGURE 10B. At point 83, all of the cores 65, 67 and 69 are in positive saturation, and the magentizing current Im rapidly builds up in the active primary winding T3a of the multivibrator circuit causing transistor Q10 to drop out of saturation and start the normal sequence of events leading to the switching off of transistor Q10 and the switching on of the transistor Q11.

When the transistor Q11 is turned on, the polarity of the square wave 101 shown in FIGURE 9 is reversed, and the current polarity through the series connected bias windings T3e, T3f and T3g is reversed which effectively switches the individual hysteresis loops from the right to the left side of the flux $\phi$ ordinate axis as indicated in FIGURE 8. Since the magnetizing current Im now builds up in the opposite direction, the cores 65, 67 and 69 are driven successively from positive to negative saturation, completing a cycle of events with the production of the negative pulses respectively following the first positive pulses shown in FIGURES 10A, 10B and 10C.

By means of the novel gating circuit 59 shown in FIGURE 1B, the outputs of the pulse generator 57 are combined to provide a set of three-phase square waves which are used to control and energize the three driver stages 61. The output winding T3h has two output leads 103 and 105, the output winding T3i has output leads 107 and 109, and the output winding T3j has output leads 111 and 113. These leads are connected to a diode matrix in the gating circuit 59 which has three pairs of output leads 115 and 117, 119 and 121, and 123 and 125.

The leads 115 and 117 are connected to the bases of driver transistors Q12 and Q13 through resistors R20 and R21, respectively. The bases of these transistors Q12 and Q13 are also connected to lead f (+18 volts relative to lead e) through respective resistors R22 and R23. Similarly, leads 119 and 121 are connected to the bases of driver transistors Q14 and Q15 through resistors R24 and R25, respectively, and the bases of these transistors Q14 and Q15 are also connected to lead f through respective resistors R26 and R27. Finally, the leads 123 and 125 are connected to the bases of driver transistors Q16 and Q17 through resistors R28 and R29, respectively, and the bases of these transistors Q16 and Q17 are also connected to lead f through respective resistors R30 and R31.

During the first positive pulse of the series of pulses 103 shown in FIGURE 10A, the output winding T3h is considered connected to be positive on lead 103 and negative on the lead 105 with respect to return lead e. When lead 103 is 6 volts positive, diodes CR14, CR15 and CR16 will not conduct, and a low positive voltage (approximately .5 volt, for example) on the bases of the transistors Q16, Q15 and Q12, respectively, will hold these transistors non-conducting.

However, the lead 105 is then 6 volts negative at that time, and diodes CR17, CR18 nd CR19 will conduct and the low positive voltage on the bases of transistors Q17, Q14 and Q13, respectively, becomes negative (of —5.9 volts, for example) to turn on these transistors. These transistors Q17, Q14 and Q13 conduct until the end of the first pulse of FIGURE 10A, and then the first positive pulse of the series of pulses 105 of FIGURE 10B becomes effective. The output winding T3i is also considered to be connected positive on lead 107 and negative on the lead 109 with respect to lead e.

In a manner similar to that described above, the transistors Q17, Q14 and Q12 are turned on for the duration of the first pulse of FIGURE 10B. The first positive pulse of the series of pulses 107 of FIGURE 10C also renders the lead 111 positive, and lead 113 negative with respect to lead e. This, then, causes the transistors Q17, Q15 and Q12 to conduct. Following this, the first negative pulse in FIGURE 10A energizes the output winding T3h so that lead 103 is negative, and lead 105 is positive with respect to lead e.

The negative lead 103 causes the transistors Q16, Q15 and Q12 to conduct, and thereafter the first negative pulse of FIGURE 10B renders the lead 107 negative and lead 109 positive with respect to lead e. The transistors Q16, Q15 and Q13 are then turned on. Finally, the negative pulse after the first positive one in FIGURE 10C causes lead 111 to be negative, and lead 113 to be positive with respect to the lead e. The negative lead 111 then causes transistors Q16, Q14 and Q13 to conduct.

Figure 11:
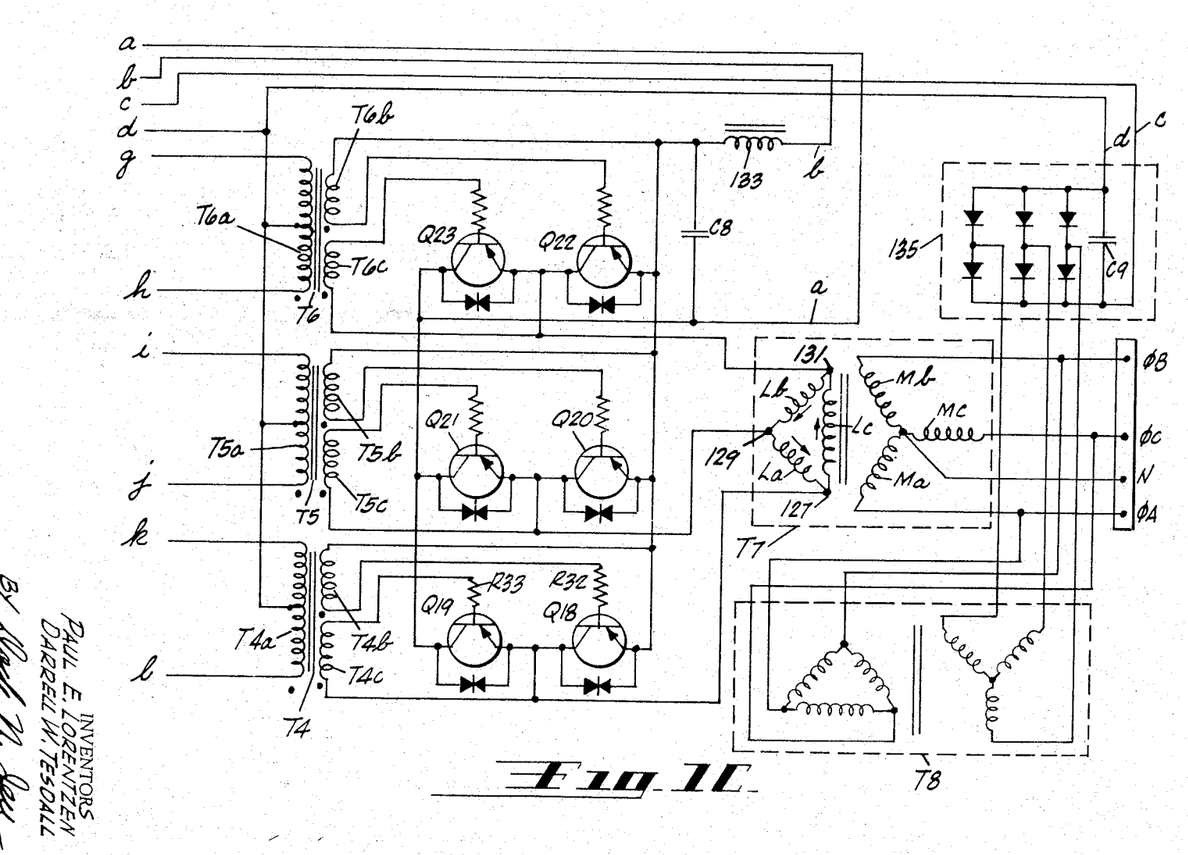
FIGURE 11 is a diagram which shows the formation of three phases of controlling signals derived from the gating circuit for the inverter circuit.

FIGURE 11 diagrammatically summarizes the action of the pulse series 103, 105 and 107 of FIGURES 10A, 10B and 10C in controlling conduction of the driver transistor pairs Q16 and Q17, Q14 and Q15, and Q12 and Q13. The first positive pulses and the following first negative pulses of each series have been grouped together within one cycle of the initiating primary voltage 101 of the transformer T3 from which the separate output pulses were produced. The resultant control of the transistors have been arranged into three square waves which are labeled phase A, phase B and phase C. The transistors that are indicated beside each of these phases of square waves, are either on or off according to the markings on the same level or row within the corresponding square waves. Those markings which are aligned vertically in the same column, describe the conditions of the corresponding transistors, indicated to the left side on the same level or row, over a same time interval, of course.

FIGURE 1C illustrates the power output stages that are driven by the output of the driver stages 61. From FIG- URE 1B, it is seen that the lead $e$ is connected to the emitters of the transistors Q16 and Q17, Q14 and Q15, and Q12 and Q13, through respective, positively oriented diodes CR20. The collectors of these transistors Q12, Q13, Q14, Q15, Q16 and Q17 are connected respectively to leads $g$, $h$, $i$, $j$, $k$ and $l$ which are continued on FIGURE 1C. It can be seen in FIGURE 11 that the outputs on leads $k$ and $l$ are associated with the phase A square wave, outputs on leads $i$ and $j$ are associated with the phase B square wave, and those on leads $g$ and $h$ are associated with the phase C square wave.

The phase A leads $k$ and $l$ are connected to the ends of the primary winding T4$a$ of a transformer T4, the phase B leads $i$ and $j$ are connected to the ends of the primary winding T5$a$ of a transformer T5, and the phase C leads $g$ and $h$ are connected to the ends of the primary winding T6$a$ of a transformer T6. The center taps of all of the primary windings T4$a$, T5$a$ and T6$a$ are connected to the lead $d$ which, from FIGURE 1A, is seen to be negative with respect to lead $e$ that is connected to the emitters of the driver transistors through the positively oriented diodes CR20.

The transformer T4 has double secondary windings T4$b$ and T4$c$, transformer T5 has double secondary windings T5$b$ and T5$c$, and transformer T6 has double secondary windings T6$b$ and T6$c$. One end of the secondary winding T4$b$ is connected to the base of a transistor Q18 through a resistor R32, and an opposite polarity end of the secondary winding T4$c$ is similarly connected to the base of a transistor Q19 through resistor R33. The other end of the secondary winding T4$b$ is connected to the emitter of the transistor Q18, and the other end of the secondary winding T4$c$ is connected to the collector of transistor Q18 and to the emitter of the transistor Q19.

The secondary windings T5$b$ and T5$c$ are similarly connected to transistors Q20 and Q21 as are the secondary windings T6$b$ and T6$c$ connected to transistors Q22 and Q23. The emitters of the transistors Q18, Q20 and Q22 are connected together, and the collectors of the transistors Q19, Q21 and Q23 are connected together to lead $a$ as shown in FIGURE 1C. Also, the collector and emitter respectively of the transistors Q18 and Q19 are connected to point 127 of the delta connected primary windings of transformer T7, the collector and emitter respectively of the transistors Q20 and Q21 are connected to point 129, and the collector and emitter respectively of the transistors Q22 and Q23 are connected to point 131. Winding L$a$ is connected between points 127 and 129, winding L$b$ is connected between points 131 and 129, and winding L$c$ is connected between points 127 and 131.

The nominal 80 volts between leads $b$ and $a$ are filtered by series inductor 133 and shunt capacitor C8 and applied between the emitters of transistors Q18, Q20 and Q22, and the collectors of the transistors Q19, Q21 and Q23 as shown in FIGURE 1C. The secondary windings of the transformer T7 are Y connected having three-phase output ends or terminals labeled $\phi$A, $\phi$B and $\phi$C, and a neutral terminal labeled N. Line-to-line output voltage is, for example, 208 volts R.M.S.

The three-phase output is also fed to a three-phase delta-Y step-down transformer T8, and the output of the transformer T8 is rectified by a conventional three-phase rectifier 135 having a filter capacitor C9 included across its output. The leads $c$ and $d$ are connected to the output of the rectifier 135, to provide the sample of the output of the inverter circuit for use in controlling or regulating the output of the controlled full wave bridge rectifier 29 shown in FIGURE 1A as previously described.

Referring now to both FIGURES 1C and 11, the transistors Q17, Q14 and Q13 are turned on during the time interval T$a$. Current flows from the lead $e$ through these transistors to the leads $l$, $i$ and $h$ to energize the lower halves of the primary windings T4$a$ and T6$a$, and the upper half of the primary winding T5$a$. The transformers T4, T5 and T6 are connected with secondary winding polarities such that the power transistors Q19, Q20 and Q23 will be turned on.

When these transistors Q19, Q20 and Q23 are on, the main supply current from lead $b$, after filtering, flows through the transistor Q20 to point 129 of the delta connected primary of output transformer T7 and through windings L$a$ and L$b$ to points 127 and 131, respectively, and on through the transistors Q19 and Q23 to lead $a$. When current flows through the windings L$a$, L$b$ and L$c$ in the directions of the arrows shown beside each winding in FIGURE 1C, positive voltages are considered developed. However, negative voltages are developed in the windings for current flow in directions which are opposite to that indicated by the arrows.

Thus, during time interval T$a$, a positive voltage is developed across winding L$a$, a negative voltage is developed across winding L$b$, and zero voltage is developed across the winding L$c$. Also, it is noted that the transistor Q20 carries twice the current carried by each of the transistors Q19 and Q23 which are essentially connected in parallel paths during the time interval T$a$.

Continuing on to the next time interval, the drive transistors Q17, Q14 and Q12 are on during the time interval T$b$ as indicated in FIGURE 11. The leads $l$, $i$ and $g$ then conduct current to energize the transformer primary windings T4$a$ and T5$a$ as before, but the current direction is reversed in the primary winding T6$a$ from that of the previous time interval T$a$. Transistors Q19 and Q20 will continue to be energized but transistor Q23 will be turned off and transistor Q22 turned on instead.

Supply current from lead $b$ (filtered) is then fed to both transistors Q20 and Q22 to points 129 and 131, respectively, of the delta primary of transformer T7 and through the windings L$a$ and L$c$ to point 127 and thence combined through the transistor Q19 back to lead $a$. A positive voltage is developed across the winding L$a$, and a negative voltage across the winding L$c$ but none across the winding L$b$. The transistor Q19 will carry twice the current that each of the transistors Q20 and Q22 carries. It should be apparent from the above description, that continuing through the remaining time intervals of T$c$, T$d$, T$e$ and T$f$, various combinations of voltages are developed across the windings L$a$, L$b$ and L$c$ of the delta connected primary of the output transformer T7.

Figure 12A:
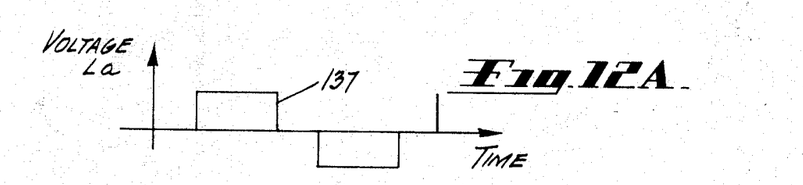
FIGURES 12A, 12B and 12C are graphs which illustrate the three-phase voltages developed across the primary windings of the output transformer for the inverter circuit.
Figure 12B:
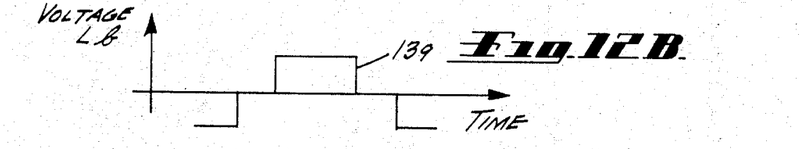
Figure 12C:
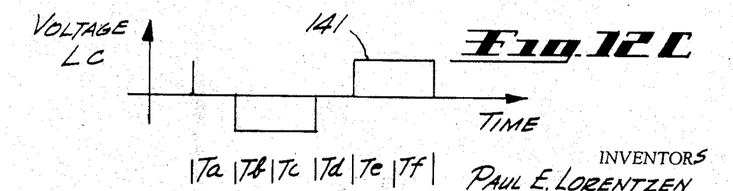

FIGURES 12A, 12B and 12C illustrate the voltage waveforms 137, 139 and 141 which are produced across the respective windings L$a$, L$b$, and L$c$. It can be seen that symmetrical, quasi square waveforms are obtained which, because of their respective symmetry, do not have even harmonics and, further, this particular quasi square waveform does not have any third harmonics or any odd multiple thereof. The lowest harmonic present is the fifth. As is well known, a third harmonic component can circulate entirely within a three-phase delta connected circuit such as the primary of the output transformer T7.

Since each of time intervals T$a$, T$b$, T$c$, T$d$, and T$e$ and T$f$ represents 60 electrical degrees, the waveforms 137, 139 and 141 are properly separated by 120 degrees for a three-phase supply. Following the usual method for obtaining root-mean-square values, the R.M.S. value of each of the quasi square waveforms is equal to .816 V$p$, where V$p$ is the peak value of the waveform.

FIGURES 13A, 13B, 13C, 13D, 13E and 13F illustrate the current conducted by the transistors Q18, Q19, Q20, Q21, Q22 and Q23, respectively. Curves 143, 145, 147, 149, 151 and 153 depict the current carried by the respective transistors Q19 through Q23 over the time intervals from T$a$ through T$f$ which covers a full cycle of the input voltage 101 at the primary of the transformer T3 shown in FIGURE 1B.

The voltages developed in the delta connected primary windings L$a$, L$b$ and L$c$ of the transformer T7 shown in FIGURE 1C are transformed to produce the usual corresponding three phase voltage in the Y connected secondary winding Ma, Mb and Mc. These are, of course, line-to-neutral voltages which can be identified as φA, φB and φC voltages. Since the original phases of primary voltages are uniformly separated by 120 electrical degrees as shown in FIGURES 12A, 12B and 12C, the corresponding phases of secondary voltage are also equally separated by 120 electrical degrees from each other.

Figures 13A, 13B, 13C, 13D, 13E, 13F, 14, 15A, 15B, 15C:
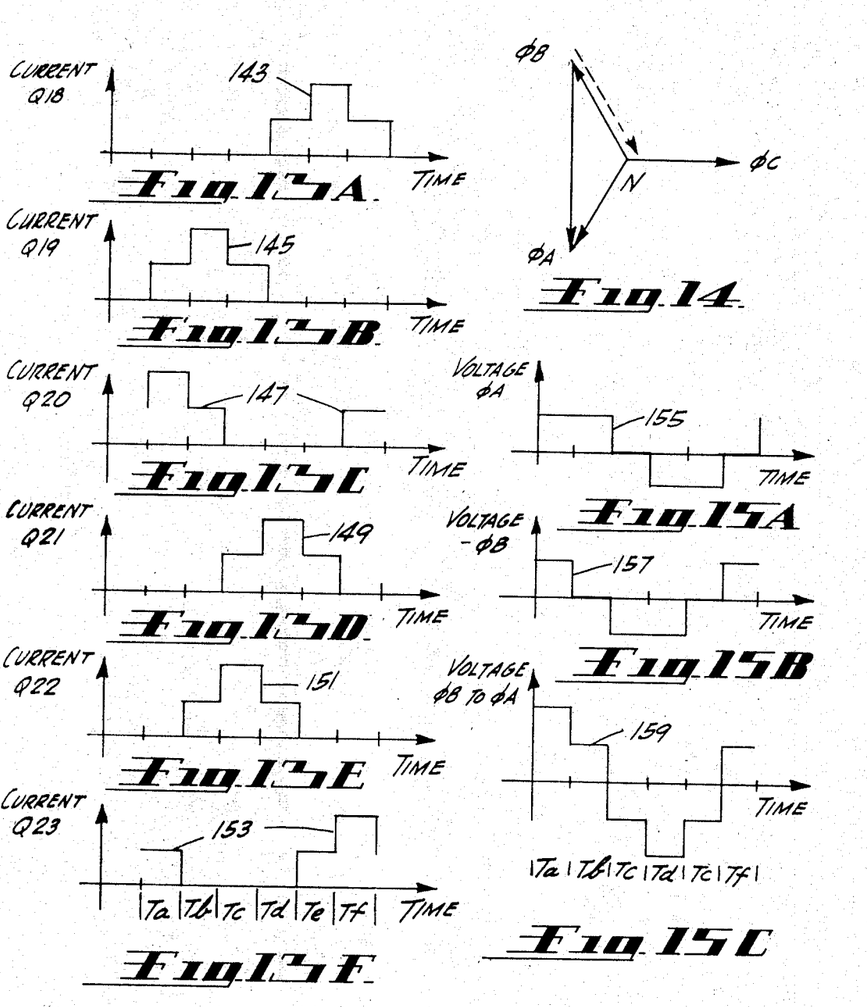
FIGURES 13A, 13B, 13C, 13D, 13E and 13F are graphs which illustrate the current conduction through different power output transistors of the inverter circuit.
FIGURE 14 is a vector diagram showing the three-phase line-to-neutral output voltages from the inverter circuit, and a line-to-line voltage derived from two of the line-to-neutral voltages.
FIGURES 15A, 15B and 15C are graphs which illustrate the formation or vector addition of two line-to-neutral output voltages to produce a line-to-line output voltage.

FIGURE 14 is a vector diagram illustrating the three-phase, line-to-neutral voltages φA, φB and φC. To obtain line-to-line voltages such as from line or terminal φB, to line or terminal φA, the line-to-neutral voltage vector φB must be reversed as indicated by the broken line vector which is −φB, and then vectorially added to the line-to-neutral voltage vector φA for the line-to-line voltage vector from line φB to line φA. Line-to-line voltages are, as mentioned previously, 208 volts R.M.S., for example.

FIGURES 15A, 15B and 15C are graphs which illustrate the vectorial addition of the voltage phases φA and −φB. The waveform 155 shown in FIGURE 15A is, of course, similar to waveform 137 of FIGURE 12A. The waveform 157 shown in FIGURE 15B is similar to the negative of the waveform 139 shown in FIGURE 12B. By adding waveforms 155 and 157 together over the corresponding time intervals Ta through Tf, the peaked, quasi square waveform 159 shown in FIGURE 15C is obtained. This waveform 159 represents the vector sum of the line-to-neutral voltage phases φA and −φB.

As indicated from FIGURE 15C, the three-phase line-to-line output voltages from the Y connected secondary windings Ma, Mb and Mc of the output transformer T7 have symmetrical waveforms which are similar to that of the illustrative waveform 159. Since the three-phase output waveforms are symmetrical, they do not contain any even harmonics. Also, just as the three-phase primary voltages of the output transformer T7, as illustrated by the waveforms 137, 139 and 141 of FIGURES 12A, 12B and 12C, the waveform 159 of FIGURE 15C does not have a third harmonic or any odd multiple thereof. As for the waveforms 137, 139 and 141, the lowest harmonic in the waveform 159 is the fifth.

It is also apparent from the waveform 159 of FIGURE 15C that the line-to-line output voltages from transformer T7 and therefore the inverter circuit, approximates a sine wave because of the centrally peaked half waves in the waveform 159. For this reason, it is possible to use an output voltage with a waveform 159 or three-phase voltages of like waveforms directly in place of a single phase sine wave voltage or three-phase sine wave voltages in driving certain components such as a motor which was designed and constructed for sine wave voltage operation.

Both types of waveforms such as the waveform 155 shown in FIGURE 15A or the waveform 159 shown in FIGURE 15C for three-phase voltages will operate most three-phase loads as well as a sine wave system. A 115 volts, three-phase, 400 c.p.s. motor has been operated from both types of waveforms with no adverse effects. For applications where the output of the inverter circuit is to be rectified and filtered, the filtering will also be more easily accomplished with these two types of waveforms than with a rectified three-phase sine wave output.

The peak of each half cycle of the waveform 159 shown in FIGURE 15C is twice the magnitude of its adjacent shoulders. The root-mean-square value for such a waveform 159, as can be determined by squaring the ordinates of a cycle of the waveform 159, finding the average area of the squared waveform over the cycle, and finding the square root of the average area, is equal to .707 Vp or one-half the square root of 2 times the peak value (Vp) of the waveform 159.

The output transformer T7 is shown in FIGURE 1C as a delta-Y three-phase transformer. However, the output transformer can be three-phase Y-Y, delta-delta or Y-delta of course. Y connected secondary windings do have the advantage of having a neutral connection available, and line-to-neutral or line-to-line voltages can be utilized as desired or required. The neutral connection would, for example, be desirable when the inverter circuit is used to power a Y connected load.

The inverter circuit described above is a high efficiency, precise frequency three-phase solid state inverter. The inverter is a static, ultra lightweight unit which can advantageously replace the heavy, mechanically rotating inverters. An operational prototype model without an output transformer weighs less than 5 pounds, and power outputs up to 1.5 kilowatts have been achieved with efficiencies of over 90%. The quasi square waveform output from the power stages can be used to power low voltage loads directly without need of an output transformer such as the transformer T7. Thus, the windings La, Lb and Lc shown in FIGURE 1C can be low voltage loads powered directly from the power stages including the transistors Q18 through Q23. A quasi square wave output or other generally squared waveform which is provided by the unit also eliminates the need for heavy, power consuming output filters.

It is to be understood that the example embodiment of the invention described above and shown in the drawings is merely illustrative of, and not restrictive on, the broad invention, and that various changes in design, structure and arrangement may be made without departing from the spirit and scope of the appended claims.

We claim:
1. An inverter system comprising:
   a source of alternating current power;
   a controlled full wave bridge rectifier connected to said alternating current power source for providing direct current output power therefrom, said controlled bridge rectifier including a pair of controlled rectifiers for controlling the direct current output power from said controlled bridge rectifier;
   a first transformer including a primary winding and a secondary winding;
   a pair of oppositely oriented, series connected zener diodes connected across said primary winding of said first transformer;
   a first full wave bridge rectifier connected to said secondary winding of said first transformer for providing a trapezoidal direct current output signal therefrom;
   a first unijunction transistor connected in a first sawtooth generator circuit having an output connected to control said pair of controlled rectifiers of said controlled bridge rectifier;
   a rate transistor connected to said first sawtooth generator circuit for controlling the repetition rate of the same according to a sample signal derived from said inverter system output, an increased sample signal decreasing the repetition rate which decreases the output power from said controlled bridge rectifier and the trapezoidal output signal from said first transformer acting to synchronize the sawtooth waveforms with each half cycle of the alternating current power input to said controlled bridge rectifier;
   a network including capacitor means and a diode shunting said capacitor means for applying an auxiliary signal to said rate transistor, augmenting control of the repetition rate of said first sawtooth generator circuit during initial phases of the sample signal whereby output of said first sawtooth generator circuit can be used to provide control of transients initially produced in power drawn from said controlled bridge rectifier by a load connected to said inverter system;
   full wave rectifying means connected to said alternating current power source for providing direct current output power therefrom;
   first and second regulator circuits connected to said full wave rectifying means for obtaining regulated negative and positive direct voltages respectively from said regulator circuits, said second regulator circuit providing the auxiliary signal to said rate transistor and including a series regulating transistor and a resistance adapted to bias said series regulating transistor to be normally conductive;

an overload control transistor biased to be normally conductive;

an overload controlled rectifier connected in series with said overload control transistor and which is normally non-conducting, said resistance being connected in series with said overload control transistor and overload controlled rectifier forming a series combination which is connected in said second regulator circuit at a point before said series regulating transistor for energization of such series combination;

a magnetic amplifier connected to sense an overload condition in a power lead from said controlled bridge rectifier and having its output voltage applied to said overload controlled rectifier to render the same conductive when such an overload is sensed;

a second unijunction transistor connected in a second sawtooth generator circuit;

a zener diode connected in series with said second sawtooth generator circuit in a series combination which is connected across said resistance, said series regulating transistor becoming non-conductively biased and removing the regulated positive voltage from supplying said inverter system, said zener diode breaking down and said second sawtooth generator circuit being responsively energized when said overload controlled rectifier is rendered conductive to produce an output signal from said second sawtooth generator circuit after a predetermined time duration;

a capacitor coupling the output signal from said second sawtooth generator to said overload control transistor for stopping conduction thereof whereby conduction of said overload controlled rectifier is also stopped to again bias said series regulating transistor to be conducting;

a sequential pulse generator including a saturable, multiple core transformer having primary and feed-back windings around all the cores, series connected bias windings of successively increasing ampere-turns on each of certain cores and an output winding for each core, and a pair of transistors connecting with said primary and feed-back windings in a multivibrator circuit;

a diode gating network including a plurality of diodes in which groups of three of said diodes connect with said output windings, respectively, for combining sequential signals therefrom into three phases of output signals;

three pairs of driver transistors, each pair being connected to said plurality of diodes to apply the three phases of output signals to respective pairs of said driver transistors to control conduction thereof in a corresponding three phase sequence;

second, third and fourth transformers each having a center tapped primary winding and double secondary windings, said primary windings of said second, third and fourth transformers being connected to respective pairs of said driver transistors, and said center taps and common junction between each of said pairs of driver transistors being connected to the negative regulated direct voltage of said first regulator circuit;

three pairs of power transistors adapted to be supplied by the output power from said controlled bridge rectifier, said power transistors of each pair being respectively connected to said double secondary windings of a corresponding one of said second, third and fourth transformers and are complementarily conductive and non-conductive in response to a corresponding phase of the three phases of output signals, for controlling the direct current output power from said controlled bridge rectifier applied to said power transistors to produce output power signals in accordance with variations of the three phase sequence;

a three-phase output transformer having a delta connected primary and a Y connected secondary, said delta connected primary being connected to said three pairs of power transistors and energized by the output power signals thereof;

a three-phase sample transformer having a Y connected primary and a delta connected secondary, said Y connected primary being connected to the three-phase output leads of the Y connected secondary of said output transformer; and a three-phase rectifier connected to the delta connected secondary of said sample transformer for providing the sample signal to said rate transistor for controlling the repetition rate of said first sawtooth generator circuit.

2. An inverter system comprising:

a source of alternating current power;

a controlled rectifier connected to said alternating current power source for providing direct current output power therefrom, said controlled rectifier including means for controlling the direct current output power from said controlled rectifier;

a first transformer including a primary winding and a secondary winding;

zener diode means connected across said primary winding of said first transformer;

a first rectifier connected to said secondary winding of said first transformer for providing a trapezoidal direct current output signal therefrom;

a first sawtooth generator circuit having an output connected to control said power controlling means of said controlled rectifier;

a rate transistor connected to said first sawtooth generator circuit for controlling the repetition rate of the same according to a sample signal derived from said inverter system output, an increased sample signal decreasing the repetition rate which decreases the output power from said controlled rectifier and the trapezoidal output signal from said first transformer acting to synchronize the sawtooth waveforms with each cycle of the alternating current power input to said controlled rectifier;

means for applying an auxiliary signal to said rate transistor, augmenting control of the repetition rate of said first sawtooth generator circuit during initial phases of the sample signal whereby output of said first sawtooth generator circuit can be used to provide control of transients initially produced in power drawn from said controlled rectifier by a load connected to said inverter system;

rectifying means connected to said alternating current power source for providing direct current output power therefrom;

first and second regulator circuits connected to said rectifying means for obtaining regulated first and second direct voltages respectively from said regulator circuits, said second regulator circuit providing the auxiliary signal to said rate transistor and including a series regulating transistor and a resistance adapted to bias said series regulting transistor to be normally conductive;

an overload control transistor biased to be normally conductive;

an overload controlled rectifier connected in series with said overload control transistor and which is normally non-conducting, said resistance being connected in series with said overload control transistor and overload controlled rectifier forming a series combination which is connected in said second regulator circuit at a point before said series regulating transistor for energization of such series combination;

a magnetic amplifier connected to sense an overload condition in a power lead from said controlled rectifier and having its output voltage applied to said overload controlled rectifier to render the same conductive when such an overload is sensed;

a second sawtooth generator circuit;

a zener diode connected in series with said second sawtooth generator circuit in a series combination which is connected across said resistance, said series regulating transistor becoming non-conductively biased and removing the regulated second voltage from supplying said inverter system, said zener diode breaking down and said second sawtooth generator circuit being responsively energized when said overload controlled rectifier is rendered conductive to produce an output signal from said second sawtooth generator circuit after a predetermined time duration;

means coupling the output signal from said second sawtooth generator to said overload control transistor for stopping conduction htereof whereby conduction of said overload controlled rectifier is also stopped to again bias said series regulating transistor to be conducting;

a sequential pulse generator including a saturable, multiple core transformer having primary and feedback windings around all the cores, series connected bias windings of successively increasing ampere-turns on each of certain cores and an output winding for each core, and a pair of transistors connecting with said primary and feedback windings in a multivibrator circuit;

a diode gating network including a plurality of diodes connecting with said output windings, for combining sequential signals therefrom into three phases of output signals;

three pairs of driver electronic devices, each pair being connected to said plurality of diodes to apply the three phases of output signals to respective pairs of said driver devices to control conduction thereof in a corresponding three phase sequence;

second, third and fourth transformers each having a center tapped primary winding and double secondary windings, said primary windings of said second, third and fourth transformers being connected to respective pairs of said driver devices, and said center taps and common junction betwen each of said pairs of driver devices being connected to the regulated first voltage of said first regulator circuit;

three pairs of power electronic devices adapted to be supplied by the output power of said controlled rectifier, said power devices of each pair being respectively connected to said double secondary windings of a corresponding one of said second, third and fourth transformers and are complementarily conductive and non-conductive in response to a corresponding phase of the three phases of output signals, for controlling the direct current output power from said controlled rectifier applied to said power devices to produce output power signals in accordance with variations of the three phase sequence;

a three-phase step-up output transformer having a primary and a secondary, said output transformer primary being connected to said three pairs of power devices and energized by the output power signals thereof;

a three-phase step-down sample transformer having a primary and a secondary, said sample transformer primary being connected to the three-phase output leads of the secondary of said output transformer; and a three-phase rectifier connected to the secondary of said sample transformer for providing the sample signal to said rate transistor for controlling the repetition rate of said first sawtooth generator circuit.

3. An inverter system comprising:

a source of alternating current power;

a controlled rectifier connected to said alternating current power source for providing direct current output power therefrom, said controlled rectifier including means for controlling the direct current output power from said controlled rectifier;

a first transformer including a primary winding and a secondary winding;

zener diode means connected across said primary winding of said first transformer;

a first rectifier connected to said secondary winding of said first transformer for providing a trapezoidal direct current output signal therefrom;

a first sawtooth generator circuit having an output connected to control said power controlling means of said controlled rectifier;

a rate transistor connected to said first sawtooth generator circuit for controlling the repetition rate of the same according to a sample signal derived from said inverter system output, an increased sample signal decreasing the repetition rate which decreases the output power from said controlled rectifier and the trapezoidal output signal from said first transformer acting to synchronize the sawtooth waveforms with each cycle of the alternating curent power input to said controlled rectifier;

means for applying an auxiliary signal to said rate transistor, augmenting control of the repetition rate of said first sawtooth generator circuit during initial phases of the sample signal whereby output of said first sawtooth generator circuit can be used to provide control of transients initially produced in power drawn from said controlled rectifier by a load connected to said inverter system;

rectifying means connected to said alternating current power source for providing direct current output power therefrom;

first and second regulator circuits connected to said rectifying means for obtaining regulated first and second direct voltages respectively from said regulator circuits, said second regulator circuit providing the auxiliary signal to said rate transistor and including a series regulating transistor and a resistance adapted to bias said series regulating transistor to be normally conductive;

an overload control transistor biased to be normally conductive;

an overload controlled rectifier connected in series with said overload control transistor and which is normally non-conducting, said resistance being connected in series with said overload control transistor and overload controlled rectifier forming a series combination which is connected in said second regulator circuit at a point before said series regulating transistor for energization of such series combination;

a magnetic amplifier connected to sense an overload condition in a power lead from said controlled rectifier and having its output voltage applied to said overload controlled rectifier to render the same conductive when such an overload is sensed;

a second sawthooth generator circuit;

a zener diode connected in series with said second sawtooth generator circuit in a series combination which is connected across said resistance, said series regulating transistor becoming non-conductively biased and removing the regulated second voltage from supplying said inverter system, said zener diode breaking down and said second sawtooth generator circuit being responsively energized when said overload controlled rectifier is rendered conductive to produce an output signal from said second sawtooth generator circuit after a predetermined time duration;

means coupling the output signal from said second sawtooth generator to said overload control transistor for stopping conduction thereof whereby conduction of said overload controlled rectifier is also stopped to again bias said series regulating transistor to be conducting;

a sequential pulse generator including a saturable, multiple core transformer having primary and feedback windings around all the cores, series connected bias windings of successively increasing ampere-turns on each of certain cores and an output winding for each core, and a pair of transistors connecting with said primary and feedback windings in a multivibrator circuit;

means for combining the sequential signals from said output windings into three phases of output signals;

three pairs of driver transistors, each pair being connected to said plurality of diodes to apply the three phases of output signals to respective pairs of said driver transistors to control conduction thereof in a corresponding three phase sequence;

second, third and fourth transformers each having a center tapped primary winding and double secondary windings, said primary windings of said second, third and fourth transformers being connected to respective pairs of said driver transistors, and said center taps and common junction between each of said pairs of driver transistors being connected to the regulated first direct voltage of said first regulator circuit;

three pairs of power transistors adapted to be supplied by the output power of said controlled rectifier, said power transistors of each pair being respectively connected to said double secondary windings of a corresponding one of said second, third and fourth transformers and are complementarily conductive and non-conductive in response to a corresponding phase of the three phases of output signals, for controlling the direct current output power from said controlled rectifier applied to said power transistors to produce output power signals in accordance with variations of the three phase sequence;

output means connected to said three pairs of power transistors for providing three phase energized output leads; and sample means connected to the three-phase output leads of said output means for providing the sample signal to said rate transistor for controlling the repetition rate of said first sawtooth generator circuit.

4. An inverter system comprising:

a source of direct current power;

a regulator circuit connected to said source of direct current power for obtaining a regulated direct voltage output;

sensing means including a saturable core transformer connected to sense an excessive current condition in a power lead from said source of direct current power, to produce an output signal when the excessive current condition is sensed;

a control transistor for controlling the regulated direct voltage output of said regulator circuit;

means for biasing said control transistor to be normally conductive to provide the regulated direct voltage output from said regulator circuit;

means responsive to the output signal of said sensing means for causing said control transistor to be non-conductive for a predetermined duration to remove the regulated direct voltage output from said regulator circuit for such duration;

a sequential pulse generator including a saturable, multiple core transformer having primary and feedback windings around all the cores, series connected bias windings of successively increasing ampere-turns on each of certain cores and an output winding for each core, and a pair of transistors connecting with said primary and feedback windings in a multivibrator circuit;

first, second and third pairs of driver transistors;

means connecting the output windings of said pulse generator to respective pairs of said driver transistors to apply the sequential signals from said pulse generator in three phases of output signals thereto, to control conduction of said driver transistors in a three phase sequence;

first, second and third transformers each having a center tapped primary winding and double secondary windings, said primary windings of said first, second and third transformers being connected to respective first, second and third pairs of said driver transistors, and said center taps and common junction between each of said pairs of driver transistors being connected to the regulated direct voltage of said regulator circuit;

first, second and third pairs of power transistors adapted to be supplied by said source of direct current power, said power transistors of each pair being respectively connected to said double secondary windings of a corresponding one of said first, second and third transformers and are complementarily conductive and non-conductive in response to a corresponding phase of the three phases of output signals, for controlling the direct current output power from said source applied to said power transistors to produce output power to a load in accordance with variations of the three phase sequence; and output means connected to said three pairs of power transistors for providing three phase energized output leads adapted to be connected to a three phase load.

5. An inverter system comprising:

a source of direct current power;

a regulator circuit connected to said source of direct current power for obtaining a regulated direct voltage output;

sensing means including a saturable core transformer connected to sense an excessive current condition in a power lead from said source of direct current power, to produce an output signal when the excessive current condition is sensed;

a control transistor for controlling the regulated direct voltage output of said regulator circuit;

means for biasing said control transistor to be normally conductive to provide the regulated direct voltage output from said regulator circuit;

means responsive to the output signal of said sensing means for causing said control transistor to be non-conductive for a predetermined duration to remove the regulated direct votlage output from said regulator circuit for such duration;

a sequential pulse generator including a saturable, multiple core transformer having primary and feedback windings around all the cores, series connected bias windings of successively increasing ampere-turns on each of certain cores and an output winding for each core, and a pair of transistors connecting with said primary and feedback windings in a multivibrator circuit;

three pairs of driver transistors;

means connecting the output windings of said pulse generator to respective pairs of said driver transistors to apply the sequential signals from said pulse generator in three phases of output signals thereto, to control conduction of said driver transistors in a three phase sequence;

three transformers each having a center tapped primary winding and double secondary windings, said primary windings of said transformers being connected to respective pairs of said driver transistors, and said center taps and common junction between each of said pairs of driver transistors being connected to the regulated direct voltage output of said regulator circuit; and three pairs of power transistors adapted to be supplied by said source of direct current power, said power transistors of each pair being respectively connected to said double secondary windings of a corresponding one of said three transformers and are complementarily conductive and non-conductive in response to a corresponding phase of the three phases of output signals, for controlling the direct current output power from said source applied to said power transistors to produce output power to a load in accordance with variations of the three phase sequence.

6. An inverter system comprising:

a source of direct current power;

a regulator circuit connected to said source of direct current power for obtaining a regulated direct voltage output;

sensing means including a saturable core transformer connected to sense an excessive current condition in a power lead from said source of direct current power, to produce an output signal when the excessive current condition is sensed;

control means for controlling the regulated directed voltage output of said regulator circuit, said control means being responsive to the output signal of said sensing means for causing the removal of the regulated direct voltage output from said regulator circuit for a predetermined duration;

a sequential pulse generator including a saturable, multiple core transformer having primary and feedback windings around all the cores, series connected bias windings of successively increasing ampere-turns on each of certain cores and an output winding for each core, and a pair of transistors connecting with said primary and feedback windings in a multivibrator circuit;

three pairs of driver transistors;

means connecting the output windings of said pulse generator to respective pairs of said driver transistors to apply the sequential signals from said pulse generator in three phases of output signals thereto, to control conduction of said driver transistors in a three phase sequence;

three transformers each having a center tapped primary winding and double secondary windings, said primary windings of said transformers being connected to respective pairs of said driver transistors, and said center taps and common junction between each of said pairs of driver transistors being connected to the regulated direct voltage output of said regulator circuit; and three pairs of power transistors adapted to be supplied by said source of direct current power, said power transistors of each pair being respectively connected to said double secondary windings of a corresponding one of said three transformers and are complementary conductive and non-conductive in response to a corresponding phase of the three phases of output signals, for controlling the direct current output power from said source applied to said power transistors to produce output power to a load in accordance with variations of the three phase sequence.

References Cited
UNITED STATES PATENTS

| | | | |
|---|---|---|---|
| 2,953,735 | 9/1960 | Schmidt | 321—5 |
| 2,992,410 | 7/1961 | Groth et al. | 307—88.5 |
| 3,046,412 | 7/1962 | Seike | 321—14 X |
| 3,052,833 | 9/1962 | Coolidge et al. | 321—5 |
| 3,060,363 | 10/1962 | Jensen | 321—5 |
| 3,091,729 | 5/1963 | Schmidt | 321—5 |
| 3,098,949 | 7/1963 | Goldberg | 317—33 |
| 3,111,632 | 11/1963 | Murphy | 331—113 |
| 3,114,098 | 12/1963 | Rallo et al. | 321—18 |
| 3,116,446 | 12/1963 | Healey | 321—18 |
| 3,127,576 | 3/1964 | Haynard | 331—113 |
| 3,132,287 | 5/1964 | Yarbrough | 317—33 |
| 3,168,692 | 2/1965 | Lilienstein | 321—5 |
| 3,177,420 | 4/1965 | Barber et al. | 321—7 |
| 3,196,337 | 7/1965 | Elliott et al. | 321—45 |

JOHN F. COUCH, *Primary Examiner.*

LLOYD McCOLLUM, *Examiner.*

J. C. SQUILLARO, W. H. BEHA, *Assistant Examiners.*